United States Patent [19]

Bourgeois et al.

[11] Patent Number: 5,567,017
[45] Date of Patent: Oct. 22, 1996

[54] FRAMEWORK ELEMENT FOR A SEAT, COMPONENT MAKING USE THEREOF, AND ITS USE ESPECIALLY FOR VEHICLE SEAT

[75] Inventors: Bernard Bourgeois, Champvert; François Fourrey, Montargis; David Quenel, Gien; Eric Zunino, Montargis, all of France

[73] Assignee: Cesa-Compagnie Europeenne de Sieges pour Automobiles, Levallois-Perret Cedex, France

[21] Appl. No.: 444,773

[22] Filed: May 19, 1995

[30] Foreign Application Priority Data

May 20, 1994 [FR] France .................................. 94 06197

[51] Int. Cl.⁶ .................................................. A47C 7/02
[52] U.S. Cl. ........................ 297/452.2; 297/452.57; 297/452.18; 297/228.13
[58] Field of Search ................ 297/452.2, 452.18, 297/452.19, 452.55, 452.57, 228.13

[56] References Cited

U.S. PATENT DOCUMENTS

| | | | |
|---|---|---|---|
| 4,607,887 | 8/1986 | Vail | 297/452.57 X |
| 5,050,932 | 9/1991 | Pipon et al. | 297/452.2 X |

FOREIGN PATENT DOCUMENTS

| | | | |
|---|---|---|---|
| 722006 | 11/1965 | Canada | 297/452.2 |
| 259201 | 3/1988 | European Pat. Off. | 297/452.2 |
| 1213749 | 4/1960 | France . | |
| 1261850 | 4/1961 | France | 297/452.2 |
| 3831636 | 9/1989 | Germany . | |
| 8909031 | 10/1989 | Germany . | |
| 4138647 | 5/1992 | Germany . | |
| 4142789 | 2/1993 | Germany . | |
| 536703 | 6/1973 | Switzerland . | |
| 683278 | 11/1952 | United Kingdom | 297/452.2 |
| 1572695 | 7/1980 | United Kingdom | 297/452.2 |
| WO9316896 | 9/1993 | WIPO . | |

*Primary Examiner*—Peter M. Cuomo
*Assistant Examiner*—Rodney B. White
*Attorney, Agent, or Firm*—Sughrue, Mion, Zinn, Macpeak & Seas

[57] ABSTRACT

The U-shaped framework element for a seat made from a deformed hollow tube makes it possible to form a component which comprises two practically parallel branches (10) and a transverse bridge (20) which joins them together with the aid of elbows (30). In cross section, these branches (10) and elbows (30) have a channel configuration with one dished face (11) and a flat opposite face (12), and in cross section, this bridge (20) has a polygon-shaped configuration with straight sides (21) and rounded vertices (22).

Use to land motor vehicles whose padding is clipped on.

15 Claims, 1 Drawing Sheet

U.S. Patent  Oct. 22, 1996  5,567,017
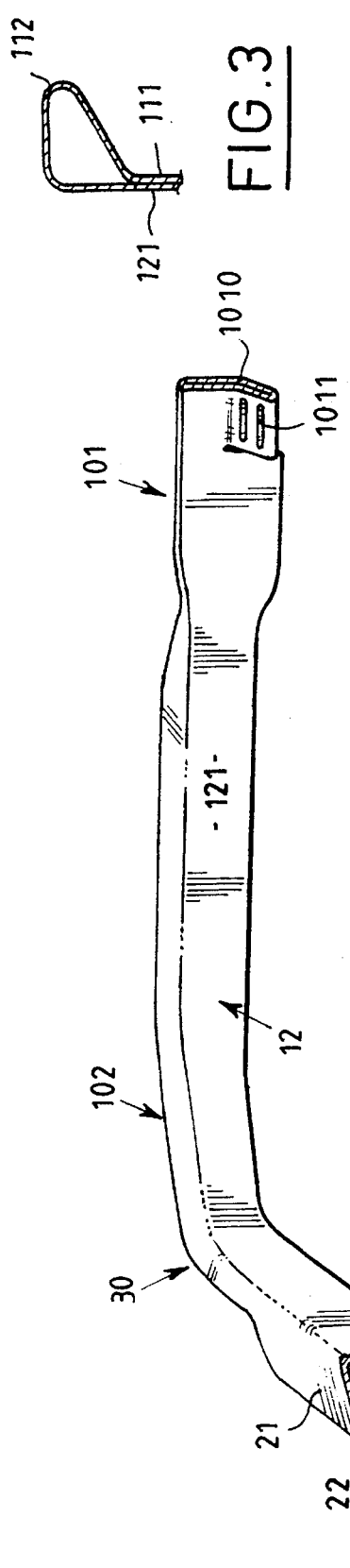
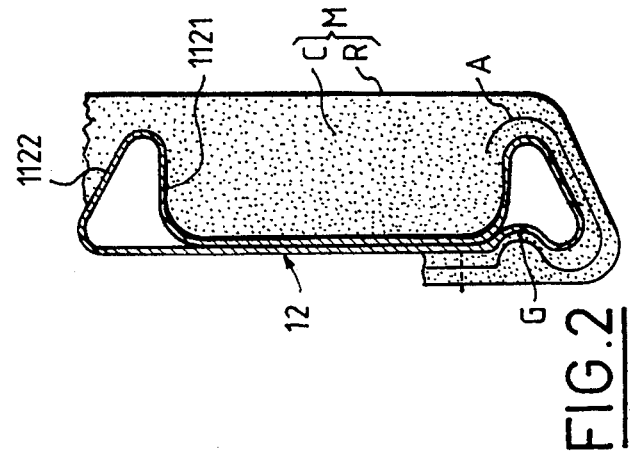

FRAMEWORK ELEMENT FOR A SEAT, COMPONENT MAKING USE THEREOF, AND ITS USE ESPECIALLY FOR VEHICLE SEAT

BACKGROUND OF THE INVENTION

The present invention relates to seats and, more particularly, those among them which have a framework, especially a metal one, and relates to an improved framework element which can be used especially to form a framework component allowing the manufacture of land motor vehicle seats.

As is known, seats with frameworks, particularly metal ones, are usually made of mechanically joined constituent parts which are designed to support cushions. When such seats are to be installed on board land motor vehicles, these seats and in particular their frameworks have to meet tight requirements as regards their mass and their size especially, and also to meet draconian regulations relating to safety which are dictated by professional bodies or the authorities. These requirements are often contradictory and particularly difficult to meet, bearing in mind that such seats have also to be mass-produced at relatively modest production costs but nevertheless also to comply with strict quality standards.

An example of a solution is proposed by the document FR 2,593,440.

SUMMARY OF THE INVENTION

The object of the invention is to manufacture a framework element for a seat made from a deformed tube which satisfies such conditions.

A subject of the invention is a framework element, especially for a seat, made from a practically cylindrical tube with a closed outline for example circular, which is noteworthy in that, in cross section, it has a channel configuration with one dished face and a practically flat opposite face which is locally in contact with this dished face.

Another subject of the invention is a framework component, especially for a seat, made from a practically cylindrical tube with a closed outline for example circular, which is noteworthy in that it is bent into a U with two practically parallel branches and a transverse bridge which joins them together with the aid of elbows and in that the two branches at least locally in cross section have the configuration of the element defined earlier.

Another subject of the invention is the use of a framework element of the type indicated earlier to the fitting, by interlocking, of padding equipped with a clip designed to come into engagement with the channel in order to straddle it and be fastened into it.

Another subject of the invention is the use of a framework element to the production of a seat especially for land motor vehicles.

Other features of the invention will emerge from reading the description and the claims which follow as well as from examining the appended drawing, given purely by way of example, in which:

BRIEF DESCRIPTION OF THE DRAWING

FIG. 1 is a part diagrammatic perspective view of one embodiment of an element according to the invention in its application to the seat part of a seat;

FIG. 2 is a local transverse sectional view of the embodiment of FIG. 1 illustrating the use of this framework element for fitting padding, by interlocking;

FIG. 3 is a part detail view similar to that of FIG. 2 of an alternative embodiment; and FIG. 4 is a local axial sectional diagrammatic part detail view of an alternative embodiment of an element according to the invention in its use to a seat backrest.

DESCRIPTION OF THE PREFERRED EMBODIMENTS

As seats in general, and particularly those designed to be fitted on board motor vehicles, especially land motor vehicles and their frameworks are well known in the art, hereafter only that to which the invention relates directly or indirectly will be described. For the rest, the person skilled in the art of the technical field in question will delve into the common conventional solutions at his disposal in order to confront the particular problems with which he is faced. In particular, he may usefully make reference to the aforementioned document.

In that which follows, the same reference numeral will always be used to identify a similar member, regardless of the embodiment or its alternative.

For the convenience of the explanation, each of the features of a framework element in accordance with the invention will be described in succession before, if need be, explaining its manufacture and use for a specific application anticipating its being "clad" with a cushion.

As is clearly illustrated in the figures of the drawing, a framework element for a seat in accordance with the invention can be used to form a U-shaped component which essentially comprises two practically parallel branches 10 and a transverse bridge 20 which joins them together with the aid of corresponding elbows 30.

Each branch 10 and, if need be, each elbow 30, comprises an element according to the invention.

As may be seen, each branch 10 and if need be, each elbow 30, comprises an element which, in cross section, has a channel configuration with one dished face 11 and a flat opposite face 12. The dished face 11 comprises a bottom 111 with two lateral rims 112 each delimited by two inner flanks 1121 and outer flanks 1122 which are, the one on the inside or the outside, practically perpendicular to the bottom 111 and the other, on the outside or the inside, oblique with respect to the bottom 111 as illustrated in FIG. 2 or FIG. 3, while the flat opposite face 12 forms a back 121 in contact with the bottom 111. At least one of the branches 10 terminates in a free end piece 101 without a rim. If need be, the free end piece 101 is equipped with a tab 1010 practically perpendicular to the flat opposite face 12. If required, at least one boss 1011 is made on the tab 1010 for reasons which will become clear later. Likewise, if need be, and for preference, at least one of the branches 10 exhibits a transition zone 102 which is inclined towards the bridge 20 and which connects it to the corresponding elbow 30.

The bridge 20 has, in cross section, a polygon-shaped configuration with straight sides 21 and rounded vertices 22.

It will be observed for the embodiment of FIG. 1, that the bridge has a triangle-shaped configuration and that the flat opposite face 12 and one straight side 21 are parallel to one and the same common direction and perpendicular to the overall plane of the U. Like-wise, it will be observed that the flat opposite face 12 and the straight side 21 which are parallel to this common direction point towards the inside of the U.

It will be observed for the embodiment of FIG. 4, that the bridge has a rectangle-shaped configuration and that the straight short sides point, in the case of one of them, towards the inside and, in the case of the other, towards the outside of the U and that its straight long sides are oriented obliquely to the plane of the U for reasons which will become clear later.

Such a framework element is preferably formed from a cylindrical tube with a closed outline, for example a practically circular metal one which is bent and deformed, for example by bending and pressing as is well known and conventional for the operations of shaping metal tubes.

It is obvious that non-metal tubes manufactured, for example from synthetic resins, if need be reinforced by for example glass or carbon fibres and by appropriate fillers to give them the desired mechanical properties may also be used. When such synthetic substances are used, the shaping techniques are suitably adapted.

A framework element in accordance with the invention lends itself particularly well to the fitting of cushion padding, especially for a seat cushion, by interlocking. In particular, padding M made of a cover R and of a cushion C and which is equipped with a clip A designed to come into engagement with the channel and especially with a rim 112 in order to straddle it and be fastened into it as is particularly clear in FIG. 2 may be used. Such fitting is facilitated for example by the presence of a groove G or the like, located on the face 12 and situated in line with one of the rims 112, as clearly illustrated in FIG. 2. The clip is for example made of metal or synthetic material and is fastened in any appropriate manner for example to the cover of the padding, or alternatively is embedded directly in the cushion if the latter is made of a synthetic resin foam as is conventional. Such padding may be manufactured so that the cover, usually made of fabric, and the foam are of a single piece and obtained in situ.

By examining the diagrammatic FIG. 2, it will be understood that the padding which comes as a single piece complete with its clip may easily be placed over the framework element by a simple interlocking operation carried out manually or with the aid of a robot or automaton. Such a type of fastening makes it possible to dispense with having to use covering caps and/or crumpling the cover.

The fact of using an outer flank which is practically perpendicular to the back or to the bottom holds the cushion on better. In fact, when the seat is occupied, the weight of the occupant does not create a force with a horizontal component tending to "drive" the cushion and particularly the foam of the latter, which would otherwise run the risk of causing the cushion to become detached.

The fact of making use of a face and likewise a back or bottom which are practically flat makes it easier to fasten, especially by welding, for example rods or other mechanisms for adjusting the inclination and/or height.

When a seat backrest framework is made, the fact of making use of a bridge with a rectangular configuration makes it possible to fit a head restraint, therein easily, for example by making holes, especially by punching, in the short sides, which holes can directly accommodate bushings, for example made of synthetic substance. The large distance which separates these holes allows the safety standards to be met.

A framework with a bridge with triangular or rectangular configuration is equally suitable for a backrest or for a seat part. When such a framework is used with a bridge with a rectangular configuration for a seat part, it is preferably contrived for the straight long sides to be oriented obliquely to the plane of the U and to point downwards from the rear of the seat to the front. Such an arrangement makes it possible to combat effectively the "submarining" effect which an occupant experiences in the event of an impact with a strong longitudinal component.

It can be seen therefore that by virtue of the invention it is possible to replace the traditional L-section or U-section mechanically joined-together frameworks, by starting from a tube which is shaped to give it a flexural inertia modulus I/V (I: flexural moment of inertia; V: distance between the neutral axis and the most compressed or most highly tensioned axis) which is optimal, discarding most of the material distant from the web which is "solid" while the lateral rims remain hollow. This makes it possible to obtain a better bending strength of the branches, this being appreciable particularly when making backrest and/or seat part frameworks. This makes it possible to obtain an appreciable reduction in the lateral size, especially well appreciated for small vehicles.

A framework element according to the invention finds a specific use in making seats which are mounted on board vehicles, particularly land motor vehicles.

The tabs allow other constituent parts of a seat, for example reinforcing and/or stiffening cross beams, to be fastened on. The bosses allow easy fastening by welding.

The foregoing clearly demonstrates the distinctive particular features of the invention, the benefit which it offers and the advantages which it affords.

We claim:

1. A framework component for a seat made from a substantially cylindrical tube with a closed outline, said tube being bent into a U-shaped configuration with two substantially parallel branches (10), two elbows (30), and a transverse bridge (20) which joins the branches together with said elbows (30), each branch (10) having, in cross section, a channel configuration with a dished face (11) and a substantially flat opposite face (12) which is locally in contact with the dished face (11), said dished face (11) comprising a substantially flat bottom (111) and two lateral rims (112) delimited by two, inner and outer, flanks (1121,1122), one of which is substantially perpendicular to the bottom (111) and the other of which is oblique with respect to the bottom (111), said opposite face (12) forming a substantially flat back (121) in contact with the substantially flat bottom (111), both said back (121) and said bottom (111) extending, perpendicularly to an overall plane of said U-shaped configuration to the branches of said U-shaped configuration, from a free end of the branch up to the corresponding elbow (30) joined to said branch.

2. The component according to claim 1, wherein the inner flank (1121) is substantially perpendicular to the bottom (111), and the outer flank (1122) is oblique with respect to the bottom (111).

3. The component according to claim 1, wherein the inner flank (1121) is oblique with respect to the bottom (111), and the outer flank (1122) is substantially perpendicular to the bottom (111).

4. The component according to claim 1, wherein each elbow has, in cross section, a channel configuration, extending from one end up to an opposite end of the elbow, with a dished face (11) and a substantially flat opposite face (12) which is locally in contact with the dished face (11), said dished face (11) comprising a substantially flat bottom (111) and two lateral rims (112) delimited by two, inner and outer, flanks (1121, 1122), one of which is substantially perpendicular to the bottom (111), and the other of which is oblique with respect to the bottom (111), said opposite face (12) forming a substantially flat back (121) in contact with said substantially flat bottom (111).

5. The component according to claim 1, wherein said opposite face (12) points towards an inner side of the U-shaped configuration.

6. The component according to claim 1, wherein at least one of the branches (10) terminates in a free end piece (101) without a rim.

7. The component according to claim 6, wherein the free end piece (101) is equipped with a tab (1010) allowing elements to be fastened on, said tab being substantially perpendicular to the flat opposite face (12).

8. The component according to claim 1, wherein at least one of the branches (10) exhibits a transition zone (102) inclined towards the bridge (20) which connects it to the corresponding elbow (30) joined thereto.

9. The component according to claim 1, wherein, in cross section, the bridge (20) has a polygon-shaped configuration with straight sides (21) and rounded vertices (22).

10. The component according to claim 4, wherein the polygon is a triangle, and wherein one of its straight sides (21) is parallel to the flat opposite face (12).

11. The component according to claim 10, wherein the straight side (21), parallel to the flat opposite face (12) points towards an inner side of the U-shaped configuration.

12. The component according to claim 11, wherein the polygon is a rectangle having straight short sides pointing one towards the inner side and the other towards an outer side of the U-shaped configuration, and having straight long sides oriented obliquely to the overall plane of the U-shaped configuration.

13. Use of the framework component in accordance with claim 1, for fitting, by interlocking, of padding (M) equipped with a clip (A) adapted to come into engagement with the channel configuration in order to straddle it and be fastened into it.

14. Use of the framework component in accordance with claim 1 for the production of a seat designed to be installed on board a land motor vehicle.

15. A framework component for a seat made from a substantially cylindrical tube with a closed outline, said tube being bent into a U-shaped configuration with two substantially parallel branches (10), two curved elbows (30), and a transverse bridge (20) which joins the branches together with the curved elbows (30), each branch (10) having, in cross section, a channel configuration with a dished face (11) and a substantially flat opposite face (12) which is locally in contact with the dished face (11), said dished face (11) comprising a substantially flat bottom (111) and two lateral rims (112) delimited by two, inner and outer, flanks (1121, 1122), one of which is substantially perpendicular to the bottom (111) and the other of which is oblique with respect to the bottom (111), said opposite face (12) forming a substantially flat back (121) in contact with the substantially flat bottom (111), both said back (121) and said bottom (111) extending, perpendicularly to an overall plane of said U-shaped configuration to the branches of said U-shaped configuration, from a free end of the branch up to the corresponding one of said curved elbows (30) which is joined to said branch, wherein the back, bottom and rims of each branch extend along a greater part of the length of the branch.

* * * * *